United States Patent
Dame et al.

(10) Patent No.: US 8,480,005 B2
(45) Date of Patent: Jul. 9, 2013

(54) CABIN HEATING CONTROL SYSTEM

(75) Inventors: Andrew Clement Dame, Saline, MI (US); Brent Jacobsen, Ann Arbor, MI (US); Robert Michael Grant, Farmington Hills, MI (US); Ken Carl Leisenring, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1248 days.

(21) Appl. No.: 11/847,049

(22) Filed: Aug. 29, 2007

(65) Prior Publication Data

US 2009/0056351 A1 Mar. 5, 2009

(51) Int. Cl.
*B60H 1/00* (2006.01)
*B60H 1/02* (2006.01)
*B60H 1/32* (2006.01)

(52) U.S. Cl.
USPC ...... 237/12.3 B; 237/5; 454/159; 123/339.14; 123/339.24

(58) Field of Classification Search
USPC ............. 237/5, 12.3 B; 454/159; 123/339.14, 123/339.24
See application file for complete search history.

(56) References Cited

U.S. PATENT DOCUMENTS

| | | | | |
|---|---|---|---|---|
| 2,309,165 A | * | 1/1943 | Candor | 165/257 |
| 4,311,653 A | * | 1/1982 | Kushida | 261/39.2 |
| 4,345,557 A | * | 8/1982 | Ikeura | 123/339.13 |
| 4,368,704 A | * | 1/1983 | Masaki | 123/339.24 |
| 4,406,261 A | * | 9/1983 | Ikeura | 123/339.24 |
| 4,406,262 A | * | 9/1983 | Ikeura | 123/339.17 |
| 4,694,798 A | * | 9/1987 | Kato et al. | 123/339.17 |
| 5,203,498 A | | 4/1993 | Kajikawa | |
| 5,235,946 A | * | 8/1993 | Fodale et al. | 123/339.22 |
| 5,249,559 A | * | 10/1993 | Weber et al. | 123/339.17 |
| 5,301,648 A | | 4/1994 | Uchinami | |
| 5,542,394 A | | 8/1996 | Tomisawa | |
| 5,784,878 A | * | 7/1998 | Kato et al. | 123/339.18 |
| 5,806,486 A | * | 9/1998 | Gee et al. | 123/339.24 |
| 5,829,676 A | * | 11/1998 | Ban et al. | 237/12.3 B |
| 5,852,995 A | | 12/1998 | Aoki et al. | |
| 5,897,056 A | * | 4/1999 | Morikawa et al. | 237/12.3 B |
| 5,938,115 A | | 8/1999 | Aoki et al. | |

(Continued)

FOREIGN PATENT DOCUMENTS

| | | |
|---|---|---|
| EP | 0834411 | 4/1998 |
| GB | 2383409 | 6/2003 |

OTHER PUBLICATIONS

Jeong, KR 2001-0059083 English machine translation, Jul. 6, 2001.*

(Continued)

*Primary Examiner* — Steven B McAllister
*Assistant Examiner* — Phillip E Decker
(74) *Attorney, Agent, or Firm* — Julia Voutyras; Alleman Hall McCoy Russell & Tuttle LLP

(57) ABSTRACT

A system described is for providing improved cabin heating. The system may include a vehicle cabin heating system having a first and second heating system receiving coolant flow from the engine; and a control system for operating the engine at a first engine idle speed upon entering idle speed control operation from previous drive operation, maintaining said first idle speed for a duration, and then increasing engine speed to increase coolant flow to the second heating system during cold ambient conditions when the second heater system is in operation.

10 Claims, 4 Drawing Sheets

U.S. PATENT DOCUMENTS

| | | | |
|---|---|---|---|
| 5,954,266 A * | 9/1999 | Hoshino et al. | 237/12.3 R |
| 6,067,959 A * | 5/2000 | Fassler et al. | 123/339.24 |
| 6,082,626 A | 7/2000 | Morikawa et al. | |
| 6,247,446 B1 * | 6/2001 | Fassler et al. | 123/339.22 |
| 6,318,152 B1 | 11/2001 | Hagihara et al. | |
| 6,467,458 B1 | 10/2002 | Suzuki et al. | |
| 6,495,991 B2 * | 12/2002 | Yuasa et al. | 320/150 |
| 6,672,284 B2 | 1/2004 | Majima | |
| 6,769,388 B2 | 8/2004 | Watanabe et al. | |
| 6,789,512 B2 | 9/2004 | Duvinage et al. | |
| 6,836,718 B2 * | 12/2004 | Hasfjord et al. | 123/339.24 |
| 7,100,383 B2 | 9/2006 | Sugesawa et al. | |

OTHER PUBLICATIONS

Jae-Yun Jeong, KR2001-0059083A English machine translation, Jul. 6, 2001.*

ISA United Kingdom International Search Report of GB0814868.6, Dec. 10, 2008, 1 page.

* cited by examiner

CABIN HEATING CONTROL SYSTEM

BACKGROUND AND SUMMARY

Vehicle climate control systems, or heating systems, may use coolant to provide cabin heat, and may further provide such coolant flow to multiple locations of the cabin, such as the, front, rear, left side, right side, etc. In some cases, during lower coolant flow (e.g., idle) conditions, the coolant flow to certain areas (e.g., to the rear cabin area of the vehicle) may be too low, and thus insufficient heat may be provided to the cabin during an extended idle condition.

One approach provides an additional pump to provide the additional flow so that such low flow conditions may be avoided. However, this may add additional system complexity and cost. The inventors herein have recognized an alternative approach may be used that increases engine idle speed during cold ambient temperature to provide the increased coolant flow to the rear cabin heating system. However, such an approach can decrease fuel economy, and increase concerns with high idle speed operation noticed by the customer.

Therefore, in one approach, a system is provided, comprising: a vehicle cabin heating system having a first and second heating system receiving coolant flow from the engine; and a control system for operating the engine at a first engine idle speed upon entering idle speed control operation from previous drive operation, maintaining said first idle speed for a duration, and then increasing engine speed to increase coolant flow to the second heating system during cold ambient conditions when the second heater system is in operation.

In this way, during normal driving conditions, while a customer drives down the road, the engine speed resulting from the drive cycle is typically high enough to provide coolant flow to the rear heater without the auxiliary pump. Then, when the vehicles comes to a stop there is typically enough thermal inertia in the heater core to provide heat for a couple of minutes, so the coolant flow can be delayed and fuel economy maintained. Yet, during those conditions of an extended low flow (e.g., extended idle), the engine speed can be increased to increase coolant flow until vehicle driving is again resumed. Thus, improved heating can be obtained while sacrificing fuel economy only during limited conditions, and while addressing vehicle drivability and high idle speed warranty concerns.

DETAILED DESCRIPTION

Figure 1:
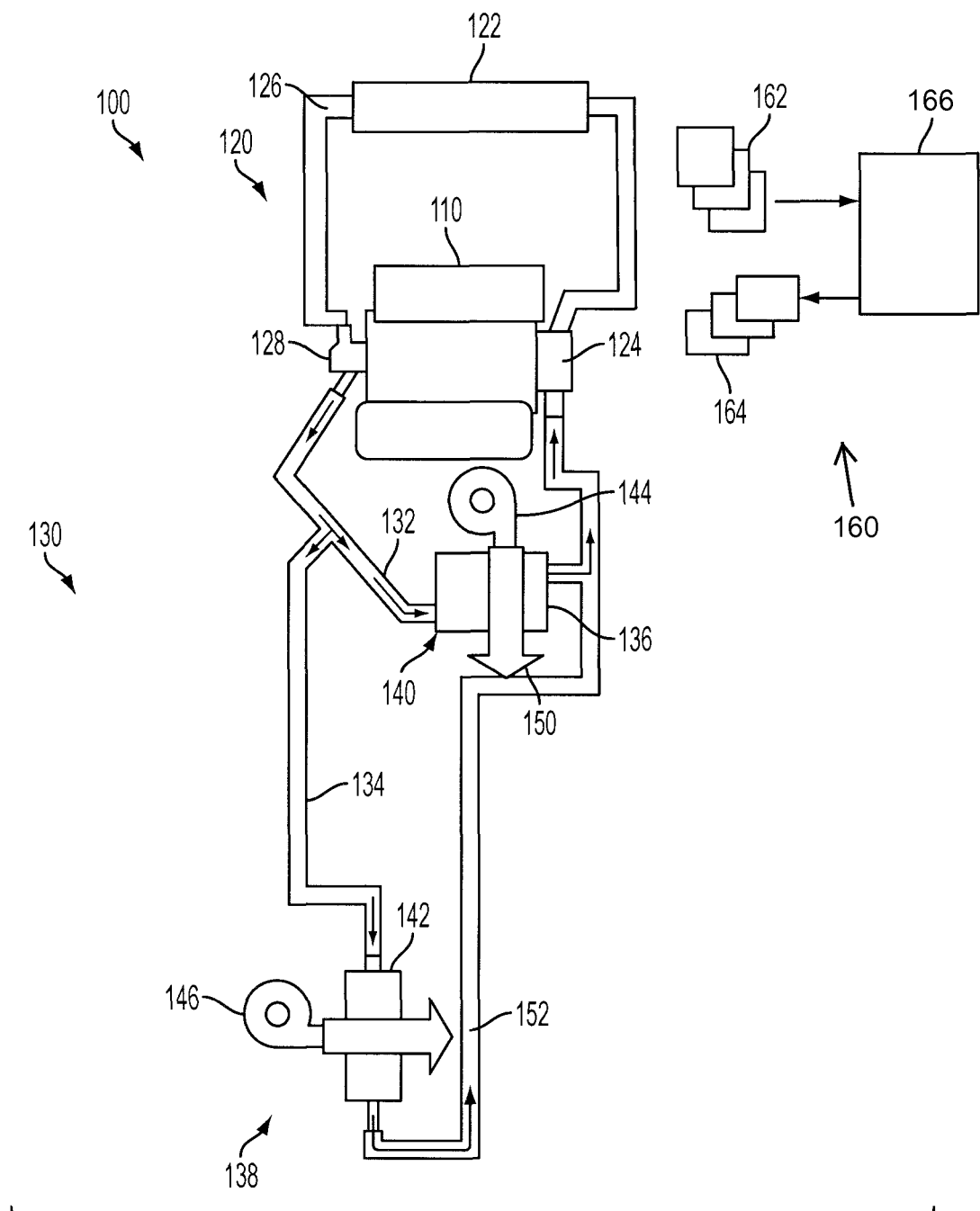
FIG. 1 schematically shows an example vehicle cabin heating system having a plurality of blowers.

FIG. 1 shows an example vehicle cabin heating system 100. The system utilizes engine waste heat absorbed by the engine cooling system to provide cabin heating to a plurality of heat exchangers, which can be referred to herein as a multi-heating unit system, and in this particular example, a dual heating system.

In particular, FIG. 1 shows an engine 110 having a cooling system 120 for circulating engine coolant from the engine to a radiator 122 via a water pump 124, and back to the engine via a coolant line 126. The water pump may be coupled on the engine front end accessory drive (FEAD), and rotated proportionally to engine speed via belt, chain, etc. Specifically, the water pump 124 circulates coolant through passages in the engine block, head, etc., to absorb engine heat, which is than transferred via the radiator 122 to ambient air. In the example where pump 124 is a centrifugal pump, the pressure (and resulting flow) produced may be proportional to the shaft speed, which in the example of FIG. 1, is directly proportional to engine speed. The temperature of the coolant may be maintained by a thermostat valve 128, located in the cooling line 126, which can be normally closed until the coolant reaches a threshold temperature.

Additionally, coolant can flow in parallel (as shown by the arrows) to the coolant line 126 to a cabin heating system 130. In this example, the cabin heating system includes two parallel coolant loops, 132 and 134, to the front and rear heating systems 136 and 138, respectively. Each of the front and rear heating system includes a heat exchanger (140 and 142, respectively), and a blower coupled thereto (144 and 146, respectively). Each of the blowers, when active, forces airflows 150 and 152 across the heat exchangers 140 and 142, respectively, thereby transferring heat from the coolant to the air. The airflow then enters the vehicle cabin, with the front blower primarily directing flow to a front portion of the cabin, and the rear blower primarily directing flow to a rear portion of the cabin.

Coolant may be forced through lines 126 dependent upon the position of the thermostat valve 128. When the valve is open, coolant may be forced through each of lines 126, 132, and 134 via pump 124. Alternatively, when the valve is closed, coolant may be forced through only lines 132 and 134 via pump 124.

FIG. 1 further shows a control system 160. Control system 160 may be communicatively coupled to various components of system 100 to carry out the control routines and actions described herein. For example, as shown in FIG. 1, control system 160 can include an electronic digital controller 166 that can receive input from a plurality of sensors 162, which may include user inputs and/or sensors (such as transmission gear position, gas pedal input, brake input, transmission selector position, vehicle speed, engine speed, mass airflow through the engine, ambient temperature, intake air temperature, etc.), cooling system sensors (such as coolant temperature, blower speeds, cabin temperature, ambient humidity, etc.), and others. Further, controller 166 can communicate with various actuators 164, which may include engine actuators (such as fuel injectors, an electronically controlled intake air throttle plate, spark plugs, etc.), cooling system actuators (such as blowers 144 and 146, air handling vents and/or diverter valves in the cabin climate control system, etc.), and others.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced. Such reduced output can be typical of idling conditions, which correspondingly also result in a relatively lower engine speed compared with driving operation, thus reducing coolant flow. During some conditions, such as low ambient temperature and extended idle operation, the reduced heat transfer to the coolant in combination with reduced coolant flow in the dual parallel loop configuration can result in insufficiently low temperature of airflow 152 in the rear heating system.

In one approach, also described below with regard to FIGS. 2-3, the control system may increase engine speed during low coolant temperature and/or flow conditions, as increasing engine speed increases waste heat and coolant flow. However, consistently providing an increase in engine idle speed can also impact vehicle fuel economy. Further, increased engine idle speed may not be necessary during all idle conditions, especially shorter length idle conditions where there may be sufficient thermal inertia in the heater cores to provide heat for a sufficient time until vehicle driving resumes. Thus, in one example, the control system may selectively control engine idle speed based on ambient conditions, cabin climate control conditions, and/or ambient conditions to address these competing objectives. Specifically, the control system may maintain a lower engine speed during an initial idling operation, and when extended idling is detected (e.g., during sufficiently cold ambient conditions and when the rear blower is active), idle speed may be increased. In this way, fuel economy effects can be reduced, without necessarily requiring an additional pump. One embodiment may use a timer to identify extended idle operation, while another embodiment may use still other sensor information. Further, the idle speed may be increased smoothly to avoid alerting the vehicle operator. Still further alternatives and examples are described further herein.

Note also that the cabin climate control system may be automatically controlled (e.g., in response to a setpoint temperature indicated by a vehicle operator/passengers), or blower speeds may be set manually by the operator/passengers in the vehicle. Also, while the example of FIG. 1 shows a front and rear heat exchanger and blower configuration, various additional heating systems may be included, such as three heating unit systems, or more. Also, while coolant flows in parallel to the front and rear heating systems, it may also be alternatively routed in series, or combinations thereof. Finally, while a single controller is shown in the control system of FIG. 1, the various control actions may be divided and/or distributed to a plurality of control units communicating over a network, such as a controller area network, as just one example.

Figure 2:
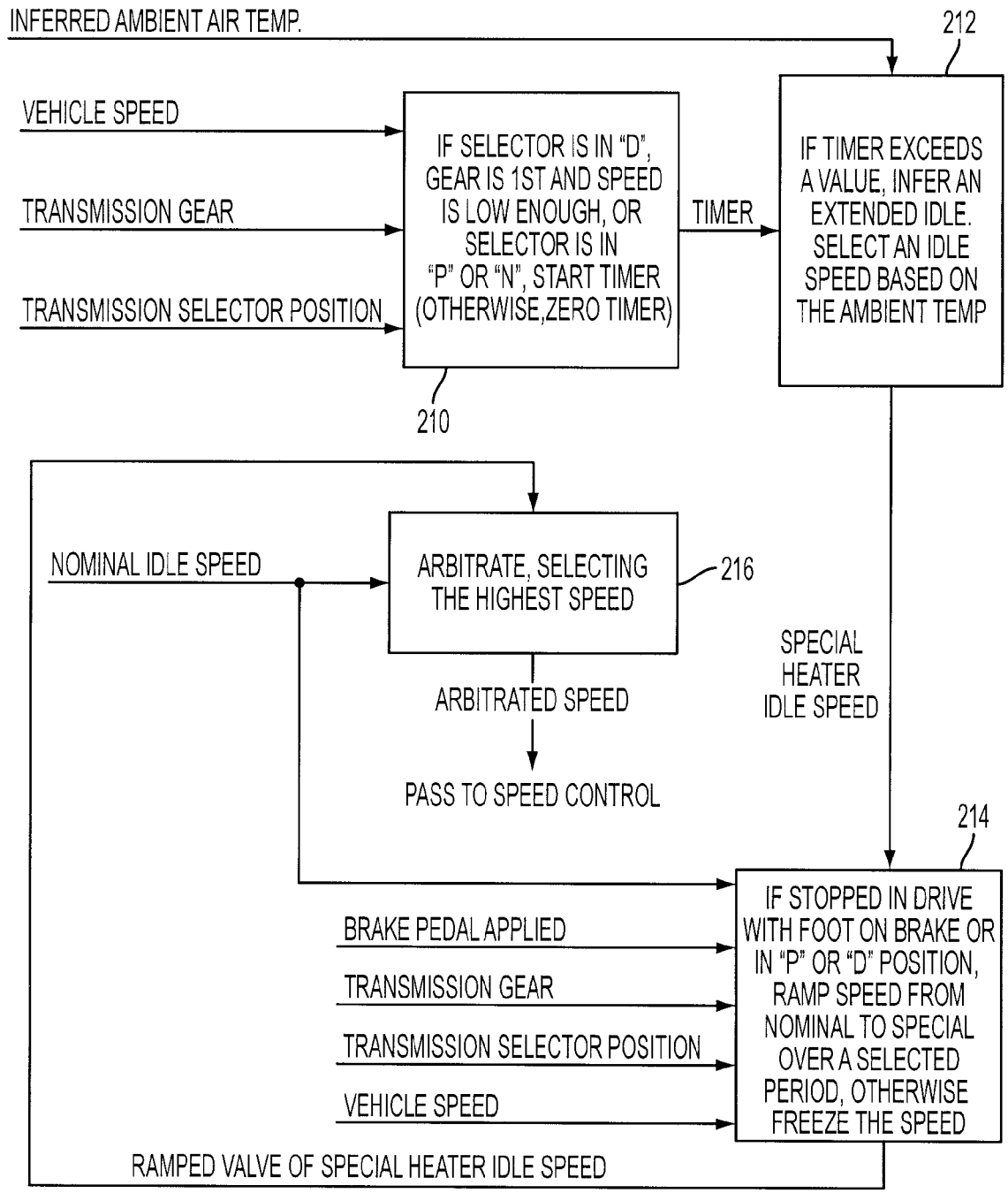
FIG. 2 schematically shows an example control system block diagram.

Referring now to FIG. 2, an example block diagram of a control routine is described for controlling system operation. The block diagram illustrates, at a high level, timer activation for identifying extending idling conditions in which increased idle speed operation may be used to provide sufficient rear cabin heating. At 210, various input parameters are used to identify whether to start the timer. In this example, vehicle speed, transmission gear, and transmission selector position (e.g., PRNDL) are used to start the time based on whether either of the following conditions are met: (1) the transmission selector position is in "D" and the vehicle speed is below a threshold, or (2) the selector is in "P" or "N". The timer value is then used in 212, and if it exceeds a time threshold value, an extended idle may be inferred. Further, an increased idle speed value for cabin heating (special heater idle speed, HIS) may be selected, where the value may be adjusted based on the ambient temperature. This speed value is then provided to 214, where a ramp may be applied based on operating conditions. In example, if the vehicle is stopped and transmission gear position is in drive or the transmission is in park "P" or drive "D", the speed value supplied to 214 is ramped from a nominal idle speed to the special speed over a selected period, otherwise the speed value is frozen at its current value.

This ramped speed is then provided to 216, where the higher value of the cabin heating speed, and a nominal idle speed value is selected, or arbitrated, where the nominal speed may be based on engine coolant temperature, ambient temperature, whether an air-conditioning compressor is activated, whether a power steering pump is activated, etc. Then, the higher speed value is passed to the idle speed controller as the desired speed (or setpoint speed), which adjusts throttle position, for example, to maintain the setpoint and reject disturbances.

In this way, it is possible to provide the increased idle speed when needed to provide sufficient heating in the rear cabin, and further to increase the speed only as much as needed based on ambient conditions. Further, by using the timer duration rather than relying solely on ambient and/or engine coolant temperature, it is possible to compensate for delays that would otherwise occur and provide sufficient heating even in varying ambient temperature conditions.

Figure 3:
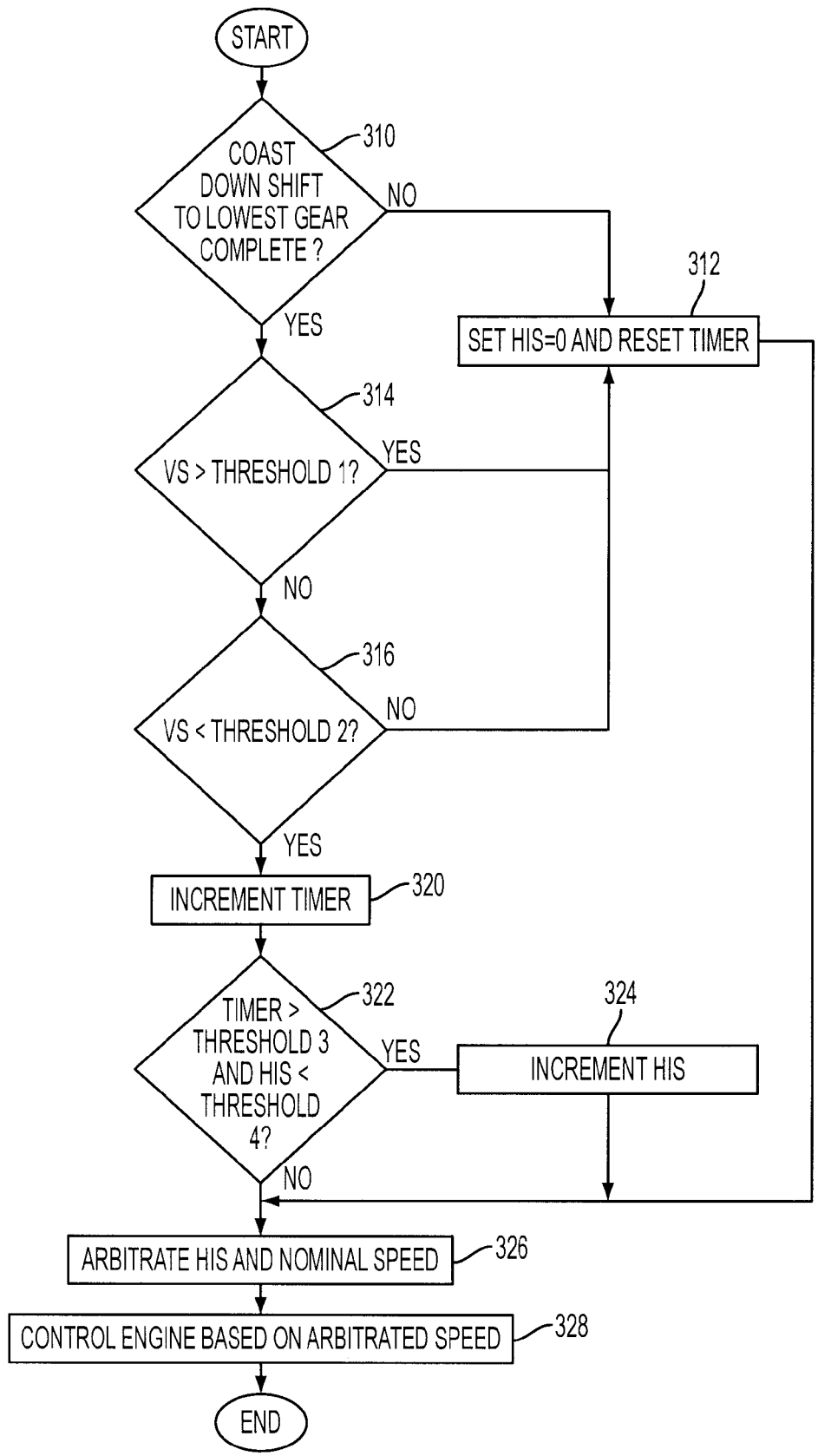
FIG. 3 schematically shows an example control system routine for controlling engine operation.

Additional details of the engine idle speed control are now illustrated with respect to FIG. 3, while provides a flow chart of an example embodiment carried out by control system 160.

First, in 310, the routine determines whether a coast down shift to the lowest gear is complete. Specifically, the routine may determine whether the shift to first gear is complete, and if not the routine sets the heater idle speed (HIS) to zero and resets the timer in 312. In this way, the routine can disable increasing of idle speed until the vehicle has performed the last coasting downshift, to reduce interactions with coasting downshifting that may degrade drive feel. Otherwise, if the answer to 310 is yes, the routine continues to 314 to determine whether vehicle speed is greater than a first threshold that can be the speed at or above which the 1-2 up-shift occurs. If so, again the routine continue to 312 to reduce interactions between increased idle speed operation and transmission shifting. Otherwise, the routine continues to 316.

In 316, the routine determines whether vehicle speed is below a second threshold below which increasing idle speed for improved heater operation is enabled. If not, the routine continues to 312. If so, the routine continues to 320 to increment the timer. In one example, the routine may increment the time by a controller sample time. However, various other durations may be used rather than a time-based timer.

From 320, the routine continues to 322 to determine whether the timer is greater than a third threshold and whether the heater idle speed (HIS) is less than a fourth threshold. Specifically, the routine identifies whether an extended idle condition is present when the timer reaches the third threshold, and further increases the heater idle speed (HIS) in 324 by an amount that may be adjusted based on operating conditions to vary a ramping rate of idle speed increase. However, if the heater idle speed (HIS) has been increased to its maximum value (e.g., the fourth threshold), further increases in idle speed are avoided. In one particular example, the rate of speed increase may be adjusted based on ambient temperature, so that lower temperature have a higher rate of idle speed increase, once the timer has reached its threshold. Various other factors can also influence the duration of the speed increase ramp, such as whether the brake is actuated, engine coolant temperature, blower fan speed (e.g., rear blower fan speed), etc.

From either 324 or when the answer to 322 is no, the routine continues to 326 to arbitrate the heater idle speed (HIS) with the nominal speed similar to that of 214. Then, in 328, the routine controls engine idle speed (e.g., via the engine throttle) based on the arbitrated idle speed value.

As noted herein, such operation enables increased idle speed to aid in rear cabin heating when necessary during extended idle operation in cold ambient temperatures, without decreasing fuel economy over all operating conditions. Further, the gradual increase in idle speed after the timer reaches the threshold value avoids alerting a vehicle operator and potentially reducing drive feel or raising concerns of degraded engine operation.

Further, note that the above routine may be modified to further include various other factors. For example, the routine may also monitor brake pedal actuation and transmission gear selector position and/or gear position. In one example, the increase in engine idle speed can be held, or temporarily frozen if the transmission is in a position other than park ("P") and the driver removes their foot from the brake (e.g., brake actuation is decreased). In this way, vehicle creep may be regulated to sufficient levels, while balancing the needs of the rear heater system.

Figure 4:
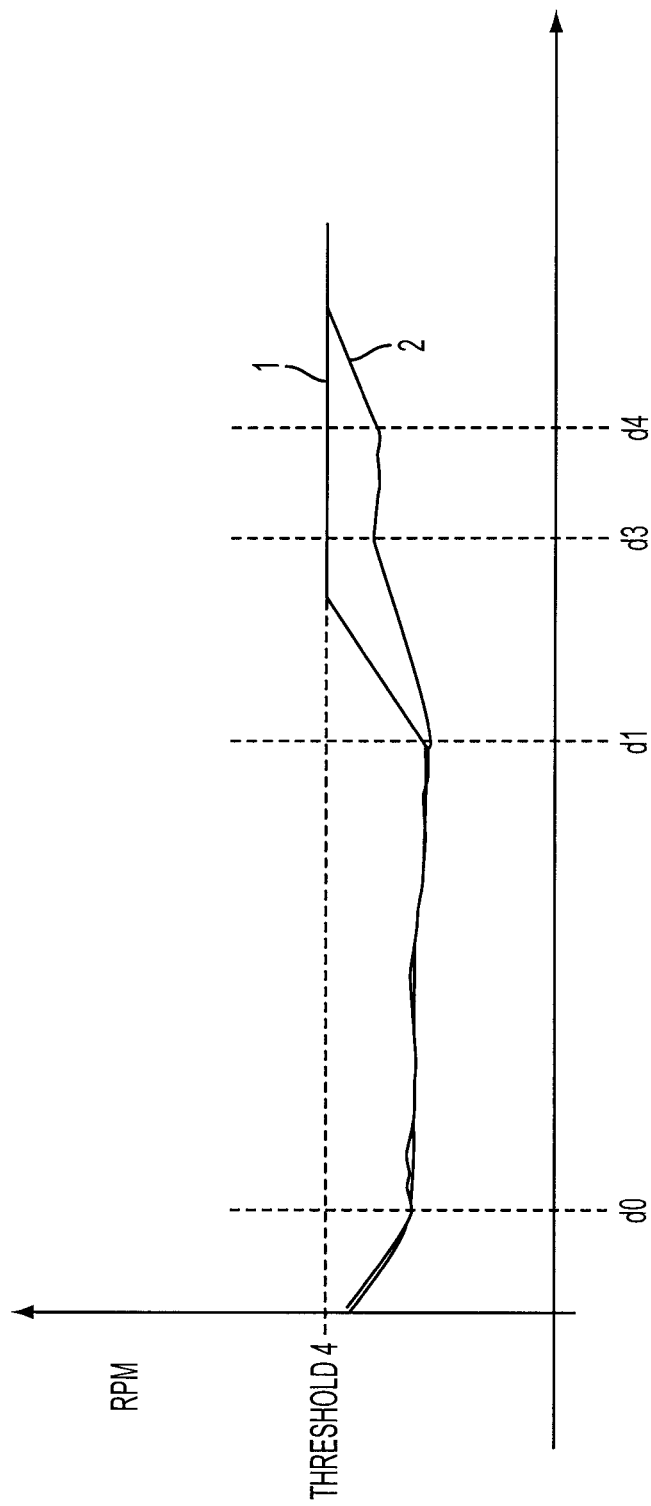
FIG. 4 shows example operational data.

Referring now to FIG. 4, a graph illustrates prophetic data of operation. Specifically, the graph illustrates engine speed (RPM) for two different events. The first line (1) illustrates the vehicle coming to an idle condition at d0, and staying in the idle condition for an extended duration, to d1. At this point, to enable improved rear cabin heating, the speed is increased at a first ramping rate to the maximum value (threshold 4), which is maintained throughout the reminder of the graph. However, in the example illustrated by the second line (2), a slower ramping rate is used starting at d1, and before the ramping is completed, at d3, an event occurs which freezes the increasing idle speed value (e.g., the brake is released). This event occurs until d4 (e.g., the brake is again actuated), and the ramping continues at the slower ramping rate to the maximum value. Such operation illustrates the different ramping rates that can be provided to tailor the increased heat rejection and coolant flow to particular ambient conditions, as well as the interaction with the vehicle operation to provide the operator with improved drive feel.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to passenger side and driver side blower configurations, and various others. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
    a vehicle cabin heating system having a first and second heating system receiving coolant flow from an engine; and
    a control system including computer readable storage medium having:
        code for operating the engine at a first engine idle speed upon entering idle speed control operation from previous drive operation; and
        code for maintaining said first idle speed for a duration, and then, based on an ambient temperature and enabled operation of the second heating system, increasing engine speed from the first idle speed to a special heater idle speed to increase coolant flow to the second heating system, the special heater idle speed based on the ambient temperature, where the control system ramps engine speed to a maximum idle speed value, and where a ramping rate is adjusted responsive to ambient temperature.

2. The system of claim 1 wherein the first heating system is a front cabin heating system and the second heating system is a rear cabin heating system.

3. The system of claim 2 further comprising an engine coolant system with a first coolant loop coupled to the front cabin heating system and a second coolant loop coupled to the rear cabin heating system.

4. The system of claim 3 where the first and second coolant loops are arranged to receive coolant flow from the engine in parallel.

5. The system of claim 4 where the engine speed increase is limited when a brake pedal is released and a vehicle gear is engaged.

6. The system of claim 1 where the control system provides a faster speed increase during colder ambient temperatures.

7. The system of claim 1 where the control system increases engine speed based on a transmission gear, a transmission gear selector position, and vehicle speed.

8. A system, comprising:
    a vehicle cabin heating system having at least a front and rear heating system receiving coolant flow from an engine via first and second coolant loops arranged in a parallel coolant flow configuration; and
    a control system including computer readable storage medium having:
        code for operating the engine at a first engine idle speed upon entering idle speed control operation from previous drive operation; and
        code for maintaining said first idle speed for a duration of a timer, and then increasing coolant flow to the rear heating system when the rear heating system is in operation by increasing engine speed from the first idle speed to a special idle speed selected based on ambient temperature, where the increased speed is enabled based on a transmission gear, a transmission gear selector position, brake activation, and vehicle speed, where the control system ramps engine speed to a maximum idle speed value, and where a ramping rate is adjusted responsive to ambient temperature.

9. The system of claim 8 where the engine speed increase is limited when a brake pedal is released and a vehicle gear is engaged.

10. The system of claim 9 where the control system provides a faster speed increase during colder ambient temperatures.

\* \* \* \* \*